United States Patent
O'Connor et al.

(10) Patent No.: US 9,549,070 B2
(45) Date of Patent: Jan. 17, 2017

(54) SYSTEM AND METHOD FOR COMPATIBILITY-BASED TEAM FORMATION

(71) Applicant: Avaya Inc., Santa Clara, CA (US)

(72) Inventors: Neil O'Connor, Lackagh (IE); Ronan Fox, Kilcolgan (IE); Paul D'Arcy, Limerick (IE); Liam Loftus, Lower Salthill (IE); Tommy Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/621,030

(22) Filed: Feb. 12, 2015

(65) Prior Publication Data
US 2016/0241716 A1    Aug. 18, 2016

(51) Int. Cl.
*H04M 3/00*    (2006.01)
*H04M 5/00*    (2006.01)
*H04M 3/523*    (2006.01)

(52) U.S. Cl.
CPC ............................ *H04M 3/5233* (2013.01)

(58) Field of Classification Search
USPC .................................................. 379/265.12
See application file for complete search history.

(56) References Cited

U.S. PATENT DOCUMENTS

| | | | | |
|---|---|---|---|---|
| 6,298,127 | B1* | 10/2001 | Petrunka | H04M 3/42323 379/115.01 |
| 6,704,409 | B1* | 3/2004 | Dilip | H04M 3/523 379/243 |
| 2006/0262922 | A1* | 11/2006 | Margulies | G06Q 30/02 379/265.12 |
| 2010/0086120 | A1* | 4/2010 | Brussat | H04M 3/5233 379/265.12 |
| 2015/0100528 | A1* | 4/2015 | Danson | G06N 5/04 706/21 |

OTHER PUBLICATIONS

Wikipedia.*

* cited by examiner

*Primary Examiner* — Quynh Nguyen (57) ABSTRACT

A system and method determines members of a team in a contact center to handle a request. The method is performed by a formation device by receiving a user request from a user device, the user request associated with a type of user request. The method includes determining a plurality of member types required in handling the request based upon the type of request. The method includes determining a plurality of agents of the contact center, the agents collectively having the member types. The method includes transmitting a request to a plurality of member devices of the contact center respectively associated with each of the agents to participate in a real-time communication with the user device in handling the user request.

20 Claims, 4 Drawing Sheets

SYSTEM AND METHOD FOR COMPATIBILITY-BASED TEAM FORMATION

BACKGROUND INFORMATION

A contact center may be used by a provider to enable a user to submit a query or request for an issue or a service handled by the provider. Specifically, one or more agents may be employed at the contact center who receives a ticket associated with the query/request such as via email or a voice communication or who receives a request to handle the query/request of the ticket. The ticket may include all relevant information for the agents to be selected to properly generate a response for the user. The agents may utilize any available resource to determine the correct response for the ticket. For example, the agent may rely upon proprietary tools, publicly available information, privacy information corresponding to the user, etc.

The query/request may require more than one agent employed by the contact center. For example, the request may require a first specialist for a first component of the request, a second specialist for a second component, etc. Accordingly, the user may be connected to a first agent who has the qualifications of the first specialist to subsequently be handed off to a second agent who has the qualifications of the second specialist, etc. In this manner, the user may be forwarded continuously until each component of the request is handled. However, this may lead to the user being inadvertently forwarded to an agent who is not equipped to handle a particular component. Furthermore, a single component may require one more or more specialists which may result in the user being forwarded back to a previous agent. That is, the process of resolving the request may become increasingly inefficient as the user is forwarded to more and more agents.

In another example, the user may be limited in an amount of time available to resolve the request. The contact center may be configured to allow multiple agents qualified in handling the request to be selected concurrently in handling the request. However, when people become involved, there may be scenarios where the roles taken by the agents are incompatible or redundant and the process of resolving the request becomes inefficient as the agents may not fully cooperate with each other or a particular role is missing. When this occurs, the limited available time may be insufficient to resolve the request.

Outside a contact center environment when an amount of time becomes more available, a team may be formed to handle a request. However, conventional systems often only determine the team based upon qualifications and skills who can best address the components of the request. This way of selecting a team does not consider how the team members interact with each other such as the roles that each member may assume which may be detrimental in handling the request. Therefore, the efficiency in completing a request may be increased through consideration of behavioral information of team members and compatibility among them during team formation. For example, a Belbin model may be used in which team compatibility forms a basis in team formation. However, this type of team formation has the luxury of time that the contact center cannot afford particularly if the request is performed in real-time such as with voice communications.

Thus, there is a need for a system to form teams including a plurality of agents to handle a request in a contact center that incorporates team compatibility among the agents.

DETAILED DESCRIPTION

The exemplary embodiments may be further understood with reference to the following description and the related appended drawings, wherein like elements are provided with the same reference numerals. The exemplary embodiments are related to a system and method configured to determine members of a team in a contact center to handle a request. Specifically, the members of the team may be selected based upon qualifications to handle a particular aspect of the request as well as a compatibility with the other members of the team. The exemplary embodiments may provide a dynamic mechanism that selects the members of the team upon receiving the request at the contact center such as in a real-time request. The contact center, the request, the team, the members, the qualifications, the compatibility, and a related method will be described in further detail below.

Initially, it should be noted that the exemplary embodiments described herein relate to a contact center that receives queries or requests (herein collectively referred to as "requests"). However, those skilled in the art will understand that the exemplary embodiments may be applied to any system in which the request is handled by a plurality of agents to determine a response to each component of the request. Thus, the contact center used herein may represent any of these systems. It should also be noted that the use of real-time communication such a voice communication in the request/response process is only exemplary. Those skilled in the art will understand that the exemplary embodiments may be utilized in any communication format between the contact center and the user and may also apply to non-real-time communications such as email.

Figure 1:
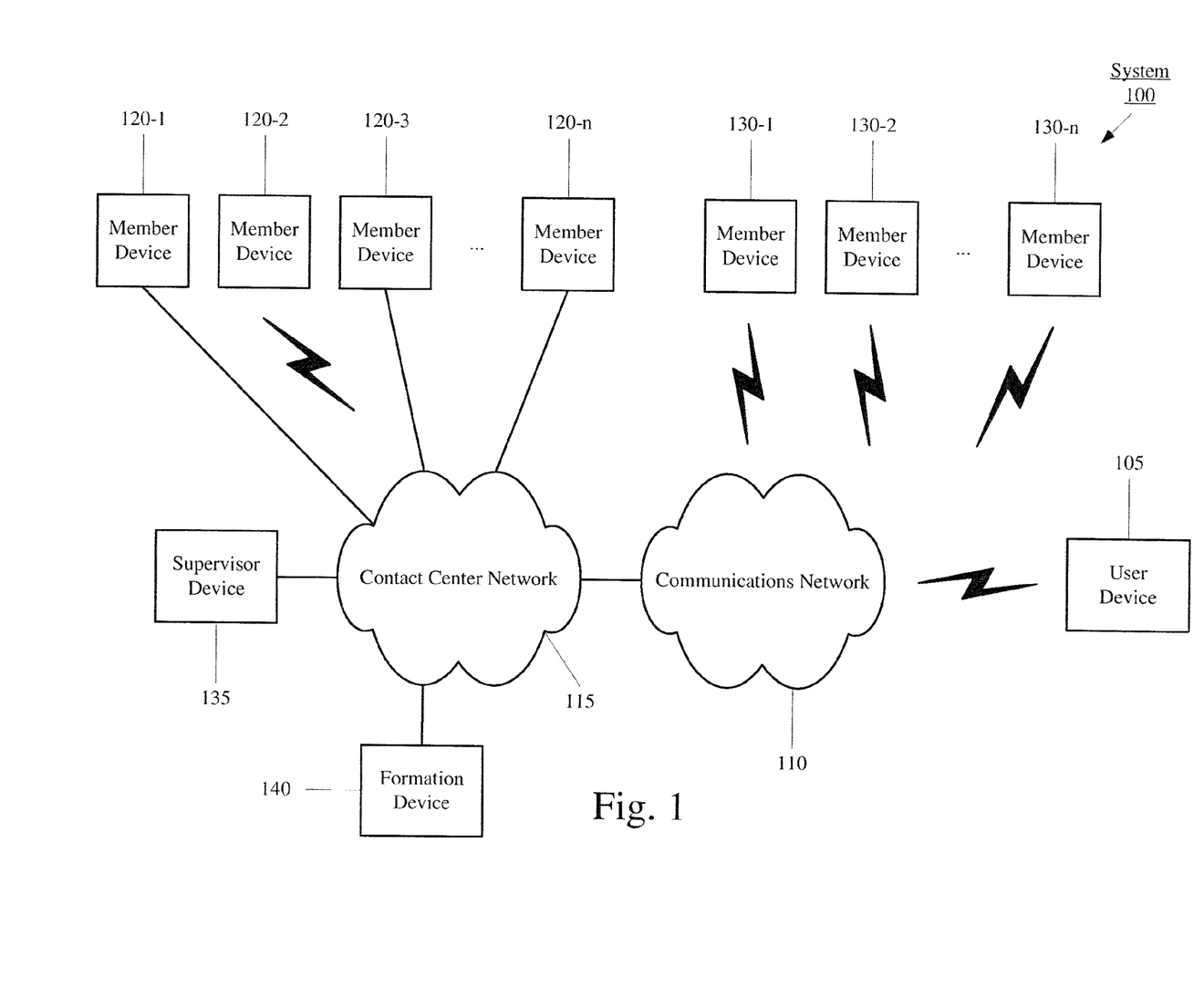
FIG. 1 shows an exemplary contact center system.

FIG. 1 shows an exemplary system 100 including a contact center and a means for a user to communicate with the contact center. The system 100 may include a communications network 110 and a contact center network 115 which are communicatively connected to one another. Accordingly, end devices connected to the communications network 110 and/or the contact center network 115 may communicate with each other. The system 100 may enable a user device 105 utilized by a user to transmit a request via the communications network 110 and the contact center network 115 to the contact center. Subsequently, a formation device 140 may receive the request and determine agents utilizing member devices 120-1 to 120-n and 130-1 to 130-n to be included in a team that handles the request. As will be described in further detail below, the system 100 may further include a supervisor device 135.

The user device 105 may represent an electronic device in which a user may transmit a request to the contact center network 115. For example, the user device 105 may be any electronic component that is configured to communicate via the communications network 110 such as a desktop computer, a laptop, a smartphone, etc. The user device 105 is shown as wirelessly communicating with the communications network 110. However, it should be noted that the user device 105 may also connect to the communications network 110 using other means such as a wired connection. Accordingly, the user device 105 may include corresponding components to enter the request (e.g., an input/output (I/O) device), to connect to the communications network 110 (e.g., a transceiver), to transmit the request, etc. More specifically, the user device 105 may be configured to execute a real-time communication application with the contact center. In a first example, the real-time communication application may be a voice application. In a second example, the real-time communication application may be a chat application. In this manner, the user may communicate with the agents of the contact center in real-time.

The communications network 110 may represent any single or plurality of networks used by the user device 105 to communicate with the contact center via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network such as a Local Area Network (LAN), a Wide Area Network (WAN), Virtual LAN (V-LAN), etc. using any variety of radio access networks such as 3G, 4G, Long Term Evolution (LTE), WiFi, etc.

The contact center network 115 may enable a plurality of devices to be interconnected with one another. For example, the contact center network 115 may be a proprietary network accessible in one manner by the agent devices 120-130, the supervisor device 135, and the formation device 140. Specifically, the agent devices 120-130, the supervisor device 135, and the oversight device 140 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data.

The contact center network 115 may also enable direct connections thereto using, for example, both wired and wireless connections. Specifically, the agent device 120-1 may utilize a wired connection to establish the connection with the contact center network 115. The agent device 120-2 may utilize a wireless connection to establish the connection with the contact center network 115. Furthermore, the agent device 120-1 and the agent device 120-2 may be within a predetermined proximity of the contact center network 115 in order to establish the connection. Using an authorization procedure (e.g., login and password), the connection for the agent devices 120-1 to 120-n may be established. In addition, the contact center network 115 may enable remote connections thereto using, for example, the communications network 110. For example, an agent, an expert, or consultant may work remotely from a location that is outside the proximity of the contact center network 115 such as the agent devices 130-1 to 130-n. Using authentication, authorization, and accounting (AAA) procedures (via a AAA server), the agent devices 130-1 to 130-n may establish a connection with the contact center network 115 in a substantially similar manner as the agent devices 120-1 to 120-n.

In view of the above description of the contact center network 115, it should be noted that the contact center network 115 may include a variety of components (not shown) to enable these functionalities. For example, the contact center network may include a server, a router, a switch center, a network management arrangement, a database, etc. It should also be noted that the use of an indefinite number of member devices 120-130 is only exemplary. Those skilled in the art will understand that the contact center may utilize a limited number of member devices. It should further be noted that the use of one supervisor device 135 is only exemplary. Those skilled in the art will understand that the contact center may utilize any number of supervisor devices to manage one or more member devices.

Figure 2:
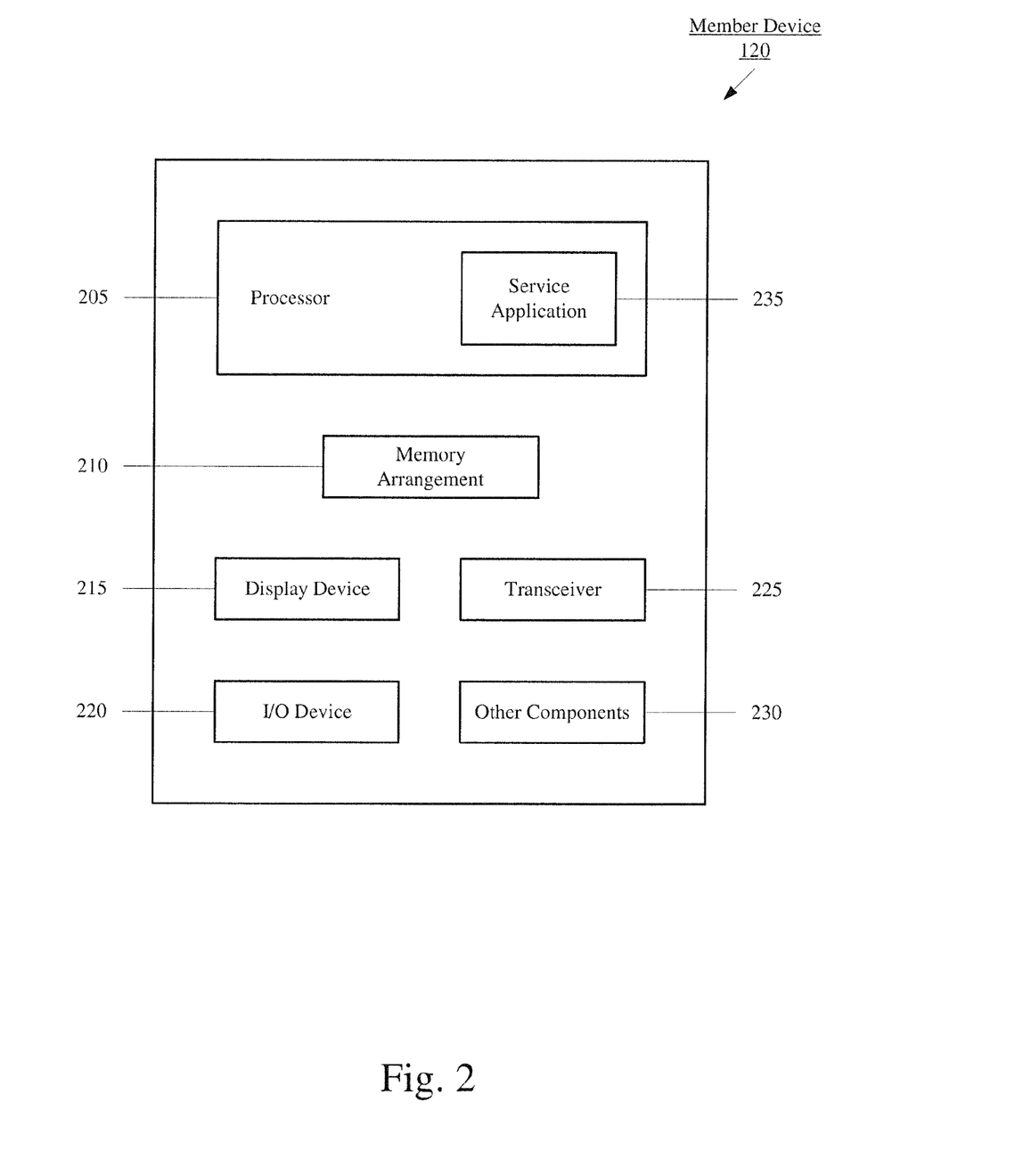
FIG. 2 shows an exemplary agent device of the contact center system of FIG. 1.

FIG. 2 shows the exemplary member device 120 of the contact center system 100 of FIG. 1. As discussed above, the member device 120 may be utilized by an agent to resolve a request from a user via the user device 105. The agent may subsequently use a process to generate a response to a component of the request that is transmitted back to the user device 105 during a real-time communication. The description herein for the member device 120 may be representative of all the member devices 120-1 to 120-n and 130-1 to 130-n as well. The member device 120 may also represent any electronic device that is configured to perform the functionalities described herein. For example, the member device 120 may be a portable device such as a tablet, a laptop, etc. In another example, the member device 120 may be a client stationary device such as a desktop terminal. The member device 120 may include a processor 205, a memory arrangement 210, a display device 215, an I/O Device 220, a transceiver 225, and other components 230 (e.g., an audio input device, an audio output device, a battery, a data acquisition device, ports to electrically connect the agent device 120 to other electronic devices, etc.).

The processor 205 may be configured to execute a plurality of applications of the member device 120. For example, the applications may include a web browser when connected to the contact center network 115 and also the communications network 110 the transceiver 225. In another example, the processor 205 may execute a call application that enables the member device 120 to perform a call functionality. Specifically, this call functionality may be the communication established with the user device 105 to handle the request. However, the call functionality may also be used for further communications established with third parties (e.g., experts, consultants, etc.). It should be noted that the call functionality may refer to any type of communication session. For example, the communication session may be an audio only call functionality (e.g., phone call), an audio/video communication functionality, etc. These types of applications may be used by the agent during the process to address the request to generate the response.

In yet another example, the processor 205 may execute a service application 235. The service application 235 may be activated upon the member device 120 joining a communication involving further member devices that form the team and the user device 105. The service application 235 may receive information regarding the request and the component(s) of the request that the member device 120 may be responsible for handling. The service application 235 may include a plurality of tools and receive other information determined from other applications such as those described above.

It should be noted that the above noted applications each being an application (e.g., a program) executed by the processor 205 is only exemplary. The functionality associated with the applications may also be represented as a separate incorporated component of the member device 120 or may be a modular component coupled to the member device 120, e.g., an integrated circuit with or without firmware.

The memory 210 may be a hardware component configured to store data related to operations performed by the member device 120. Specifically, the memory 210 may store data related to the web browser, the call application, and the service application 235. For example, the call application may utilize a contact list who may be experts or consultants required to reach during the process to handle the request. In another example, the memory 210 may store compatibility information of the agent using the member device 120. The compatibility information may be based upon any type of standard such as based upon an examination of the agent under a Belbin standard as those skilled in the art will understand. Specifically, the agents utilizing the member devices 120-1 to 12-n and 130-1 to 130-n may have been requested to take an examination or were observed over time to determine a role that is normally assumed in a team environment or a type of personality when in a team. As those skilled in the art will understand, the Belbin standard may define a plurality of roles such as a plant, a resource investigator, a chairman or coordinator, a shaper, a monitor-evaluator, a team worker, a company worker or implementer, a completer finisher, and a specialist. Therefore, the agent may have been determined to be one of these roles. Thus, when requested, this compatibility information may be transmitted, for example, to the formation device 140. However, it should again be noted that the Belbin standard is only exemplary and any behavioral standard including the above noted personality standard may also be used.

In a further example, the memory 210 may also store qualification information of the agent using the member device 120. The qualification information may be technical characteristics or skills of the agent and the capability in performing various operations related to the service provided by the contact center. Thus, when requested, this qualification information may be transmitted, for example, to the formation device 140.

The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the functionalities of the different applications being performed.

It should be noted that the service application 235 may be used for any type of product or service that the contact center is associated. The exemplary embodiments may be applied in each of these instances and provide the functionalities described herein without significant modifications thereto. For example, the contact center may be used for any product or service ranging from sales, insurance, customer service, etc. and the exemplary embodiments may be used therewith.

Figure 3:
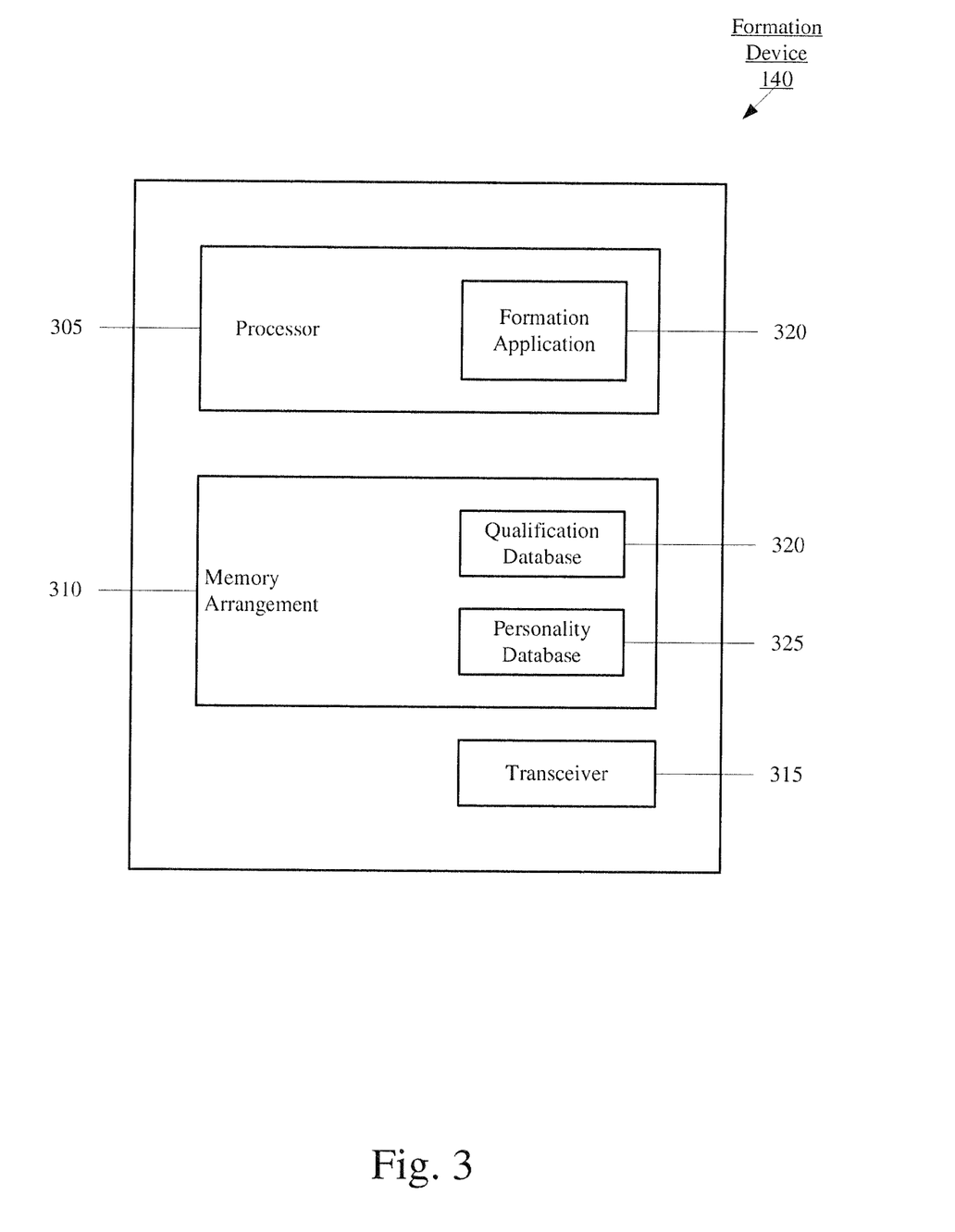
FIG. 3 shows an exemplary formation device of the contact center system of FIG. 1.

FIG. 3 shows the exemplary formation device 140 of the contact center system 100 of FIG. 1. As discussed above, the formation device 140 may be a mechanism that selects members (i.e., agents utilizing the member devices 120-1 to 120-n and 130-1 to 130-n) to be included in a team responsible for handling the request from the user device 105. The formation device 140 may be configured to automatically select the members upon receiving the request and/or information of the request from the user device 105. As discussed above, the contact center network 115 may be configured to receive the request and, if determined to require more than one agent to handle the request, automatically forward the request to the formation device 140. The formation device 140 may also automatically receive the request as well and make the determination of whether a plurality of agents are required for the request.

The formation device 140 may be preconfigured with a variety of parameters to make the member selections. For example, an administrator may pre-program the formation device 140 to perform its intended functionality. In a substantially similar manner as the agent device 120, the formation device 140 may represent any electronic device that is configured to perform the functionalities described herein. The formation device 140 may include a processor 305, a memory arrangement 310, and a transceiver 315 that provide functionalities substantially similar to those corresponding to the agent device 120. It should be noted that the formation device 140 may also include further components such as a display device and an I/O device that enable the administrator to configure the formation device 140 to perform its intended functionalities. However, it should also be noted that the formation device 140 may be configured to receive these instructions via the transceiver 215 to automatically implement the policies upon reception.

The processor 305 may be configured to execute a formation application 320. The formation application 320 may receive the request and the information thereof from the contact center network 115. More specifically, the information regarding the request may include tags or indicators that define the request. Accordingly, the formation application 320 may have a basis in which to determine the qualifications of skills necessary in handling the request. Again, it may be assumed that the contact center network 115 or the formation device 140 has determined that the request requires a plurality of agents using the member devices to handle the request.

The memory arrangement 310 may include a formation database 325. In a first example, the formation database 325 may include information on types of requests as well as member qualifications and member roles that may be required for each type of request. It should be noted that the request may include one or more types and the formation database 325 may store each of these correspondences. Accordingly, the formation application 320 may be configured to make the selections of team members. The formation database 325 may also include a plurality of agents and corresponding qualification information as well as compatibility information. As discussed above, the member devices 120-1 to 120-n and 130-1 to 130-n may store the qualification and personality information in a respective memory arrangement 210. The information may be provided or transmitted to the formation device 140 in a variety of different manners.

In a first example, when the member devices 120-1 to 120-n are activated and connect to the contact center network 115 or the member devices 130-1 to 130-n perform the AAA procedure to connect to the contact center network 115, the member devices 120-1 to 120-n and 130-1 to 13-n may be automatically configured to transmit the qualification and compatibility information to the formation device 140. As different agents may utilize different member devices 120-1 to 120-n and 130-1 to 130-n at any given time, this may also provide information to the formation device 140 of the device being used. For example, when an agent logs into the contact center network 115 using corresponding credentials, the qualification and compatibility information of the agent may be determined such as when this information is stored in the memory arrangement 210 of the member device or on a network database of the contact center network 115. This information may be transmitted to the formation device 140 when the member device is being utilized or activated. In this manner, the formation device 140 may have knowledge of all active member devices that are in use and potentially available when a request is received. This may represent one type of availability information that the formation device 140 may have in performing its functionality of forming a team to handle the request.

In a second example, when the member devices 120-1 to 120-n and 130-1 to 130-n are being utilized (e.g., already connected to the contact center network 115) such as being known from the above example, the member devices 120-1 to 120-n and 130-1 to 130-n may transmit the qualification and compatibility information when in an idle state. That is, when the member devices 120-1 to 120-n and 130-1 to 130-n are not involved in a communication with a user device, the agents utilizing these devices may be available for a subsequent request. The idle state may be triggered in a variety of different instances. In a first example, when the agent first logs into the system, the member device may be placed into the idle state such that the information is transmitted to the formation device 140. In a second example, when the agent has completed a communication with a user device having a request, the member device may be placed into the idle state such that the information is transmitted to the formation device 140. By transmitting the qualification and compatibility information at these different times, the formation device 140 may additionally have knowledge of all active member devices that are available when a request is received. This may represent another type of availability information that the formation device 140 may have in performing its functionality of forming a team to handle the request. It should be noted that if the formation device 140 is already in reception of the qualification and compatibility information of the agent using the member device that has become available, the member device may transmit an indication of its availability rather than re-transmitting the qualification and compatibility information.

In a third example, the formation device 140 may receive the request and the information thereof to trigger a transmission of requests to the member devices 120-1 to 120-n and 130-1 to 130-n. Specifically, the requests to the member devices 120-1 to 120-n and 130-1 to 13-n may be to transmit the qualification and compatibility information of the current agent utilizing the corresponding member device. Again, if the formation device 140 already has the qualification and compatibility information, an indication may be transmitted upon the member device receiving the request from the formation device 140. This may further filter the knowledge that the formation device 140 has to form the team that will handle the request. For example, if one of the member devices is involved in a communication for a different request, the member devices may be configured to not send the requested information until the member device becomes available. Accordingly, when the formation device 140 receives the requested information, the formation device 140 may have knowledge of all active member devices that are available and which agents using these member devices are to be selected for the given request. This may represent a further type of availability information that the formation device 140 may have in performing its functionality of forming a team to handle the request.

According to the exemplary embodiments, the formation device 140 may receive the qualification and compatibility information from the member devices 120-1 to 120-n and 130-1 to 130-n. Furthermore, upon the formation device 140 receiving the request from the user device 105, the formation device 140 may determine or may be indicated that the request requires a team including two or more agents utilizing the member devices 120-1 to 120-n and 130-1 to 130-n. The formation device 140 may utilize the qualification information to determine the agents who have the necessary skills to handle a particular component of the request. The formation device 140 may also utilize the formation database 325 to determine the roles of the available members who may potentially be included in the team to handle the request. The formation device 140 may further utilize the compatibility information to determine how selected, qualified agents are expected to interact with one another when placed into a common team.

Those skilled in the art will understand that a project such as the request may require more than one individual to complete. To expedite the processing of the request as well as improve efficiency in completing the request, multiple members may work collaboratively and concurrently on the project. However, this may result in role clashes or role absences that may be detrimental to the overall efficiency in completing the request. Therefore, the formation device 140 may further consider the compatibility information in forming the team.

In a specific embodiment, the compatibility information utilized by the formation device 140 may be formatted as Belbin data. However, those skilled in the art will understand that any behavioral model may be used in generating the personality information of the agents using the member devices 120-1 to 120-n and 130-1 to 130-n. The formation device 140 provides a mechanism to instantly and automatically assemble a set of disparate resources (e.g., the agents) that are qualified in handling the request but also includes an optimal mix (e.g., role, personality, etc.) for team function. The formation application 320 may increase a likelihood that a most compatible mix of roles of the available agents are included on a common team by leveraging behavioral science as part of work assignment team formation to yield a behaviorally optimized team in contrast to a purely skills-centric team formation.

The selection strategy employed by the formation application 320 may include rules to assemble the team. For example, the rules may be based upon vertical or industry concerns such as a "Hot Site" team, an "Adverse Marketing Event Response" team, a "Severe Weather Event" team, etc. With particular regard to a marketing event, the user device 105 may communicate with the contact center and provide details thereof. Accordingly, it may be determined that a team is required to handle the request. The team may consist of a variety of different members such as responsible executive, one or more personal relation experts, a technology expert, one or more members familiar with the adverse event and its impact to date, etc. That is, these may be different roles needed in the team as indicated in the formation database 325 based upon the request.

The formation application 320 may shape the resources selected to form a team according to the compatibility information such as the Belbin data of the agents. For example, if there are multiple personal relation agents (e.g., utilizing any of the member devices 120-1 to 120-n or 130-1 to 130-n), then an implementer and a team worker (as understood by those skilled in the art) may be selected. Among the technology agents, a plant may be chosen because creative use of technology may be required to use social media to respond to the request. The team formation may avoid shapers except for the responsible executive whose responsibility involves challenging the team to determine the best response to the request (e.g., agent using the supervisor device 135). All these agents may be selected based upon the qualification information as well as the compatibility information.

In view of the consideration of the compatibility information, it should be noted that the formation device 140 may select the team members in a variety of manners to optimize a particular parameter of the team. For example, the formation device 140 may utilize a skills approach in which the members who exhibit the highest proficiency in skills for the request may be given preference in selection. Accordingly, the compatibility of the members may be sub-optimal. In another example, the formation device 140 may utilize a compatibility approach in which the members who work best together based upon compatibility information may be given preference in selection. Accordingly, the skills of the members may be sub-optimal. In a further example, a combination of these factors may be used. In this manner, the formation device 140 may determine the team based upon all the needs of the request. For example, if a request requires a fast turnaround, the skill approach may be used when the interaction among the members is minimal. That is, further information beyond that related to the qualification and compatibility of the agents may additionally be used by the formation device 140 in determining the members of the team.

Figure 4:
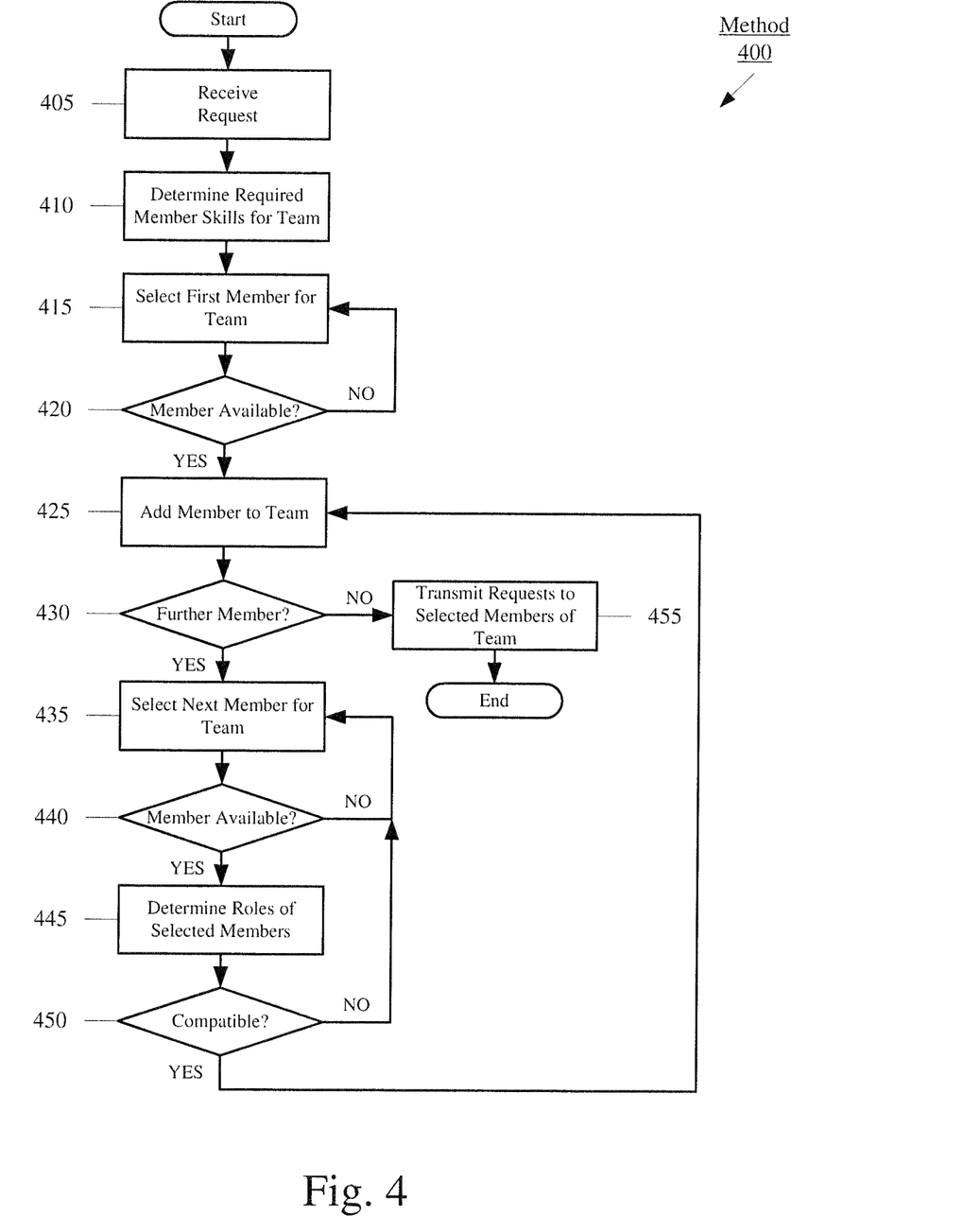
FIG. 4 shows an exemplary method for determining members of a team in a contact center to handle a request.

FIG. 4 shows an exemplary method 400 for determining members of a team in a contact center to handle a request. The method 400 may relate particularly to forming a team that has members who have the capability of handling the request where each member may handle one or more components of the request and who have a compatibility with each other in working together to handle the request. The method 400 also relates to the request being determined to require more than one agent of the contact center to fully address the request and all its components. The method 400 will be described with regard to the contact center system 100 of FIG. 1, the member device 120 of FIG. 2, and the formation device 140 of FIG. 3.

In step 405, the formation device 140 receives the request from the user device 105 and/or information of the request. As discussed above, the user device 105 may transmit a request via the communications network 110 and the contact center network 115. The contact center may be configured to automatically determine whether the request requires one or more agents to handle the components of the request. Again, it may be assumed that more than one agent is required or recommended. In another example, the supervisor device 135 may receive the request and manually determine that more than one agent is required. The supervisor device 135 mat forward the request and the information to the formation device 140.

In step 410, the formation device 140 may determine the required member skills for the team that will handle the request. As discussed above, each request may include tags, indicators, etc. or the formation device 140 may determine the context in which the request entails. Thus, the formation device 140 may determine or may receive a determination of which skills may be required in handling the request.

Based upon the needed skills, in step 415, the formation device 140 may select a first member of the team. As discussed above, the formation device 140 may select the first member of the team based upon the qualification information received or retrieved from the member devices 120-1 to 1200-n and 130-1 to 130-n. Also discussed above, there may be a variety of manners in which the qualification information may be received. The first member of the team may also be determined for selection based upon the request. For example, the formation device 140 may determine that there is one particular component of the request that is of higher importance than other components. In view of this higher importance component, the first member may have the skill to handle this component and therefore be the first member selected. However, it should be noted that this manner of selecting the first member is only exemplary. The formation device 140 may utilize any other way of selecting the first member such as a random selection. In fact, as will be described below, the formation device 140 may not select the members in an ordered fashion but may select the team as a whole.

In step 420, the formation device 140 may determine whether the selected member is available. As discussed above, the formation device 140 may receive the qualification information in a variety of manners such as when the member devices 120-1 to 120-n and 130-1 to 130-n are activated. Thus, the formation device 140 may be aware that these member devices are activated and used by corresponding agents. However, depending upon when the request is received, the formation device 140 may first determine availability of the agents at a particular time. If the formation device 140 determines that the selected first member is unavailable, the formation device 140 returns the method 400 to step 415 where a different first member is selected. However, if the selected first member is available, the formation device 140 continues the method 400 to step 425. In step 425, the first selected member is added as a member of the team to handle the given request.

In step 430, the formation device 140 determines whether further members are required in forming the team. For example, there may be further skills that are needed to fulfill the components of the request. When further members are required, the formation device 140 continues the method 400 to step 435. In step 435, the formation device 140 selects a next member for the team. At this stage, the formation device 140 selects a second member for the team. Again, this may be based upon the remaining skills needed for the request. In step 440, the formation device 140 determines whether the selected second member is available. If unavailable, the formation device 140 returns the method 400 to step 435 to select a different second member. If available, the formation device 140 continues the method 400 to step 445.

In step 445, the formation device 140 determines the roles of the selected members. More generally, the formation device 140 determines the compatibility factor for each selected member. As discussed above, when related to Belbin data, the request may be determined to have a recommended list of roles such as one coordinator, two plants, etc. If the first selected member is determined to be a coordinator while the second selected member is determined to be a plant, there is no conflict. If the first and second selected members are both determined to be plants, there is also no conflict. If the first selected member is determined to be both a coordinator and a plant while the second selected member is determined to be only a coordinator, there is still no conflict as the first selected member may be assigned as a plant. However, if the first and second selected members are both determined to be only coordinators, there may be a conflict as only one coordinator is needed.

Thus, in step 450, the formation device 140 determines the compatibility of the selected members so far based upon the compatibility information that was also determined or received from the member devices 120-1 to 120-n and 130-1 to 130-n. If the formation device 140 determines that the selected members are incompatible, the formation device 140 returns the method 400 to step 435 where a different member is selected. In view of the first member being added already and potentially being of greater importance, a different second member may be determined. However, if the formation device 140 determines that the selected members are compatible, the formation device 140 continues the method to step 425 where the selected second member is added to the team.

The formation device 140 may continue this process until the formation device 140 determines in step 430 that no further members are required to be selected for the team. That is, the team includes members that are capable of addressing each component of the request to thereby handle the request as a whole and that the members are the most compatible given the available agents at the time of the request. When the team is complete, the formation device 140 continues the method 400 to step 455. With each member being determined for the team, the formation device transmits requests to each selected member to join the communication with the user of the user device 105 having the request. The formation device 140 may be configured to perform the above functionality within a predetermined time limit as the communication with the user device 105 may be in real-time.

It should be noted that the above method is only exemplary and may include a variety of different steps or additional steps. In a first example, the formation device 140 may have received or determined the availability information of the agents utilizing the member devices 120-1 to 120-n and 130-1 to 130-n. That is, the formation device 140 may have previously transmitted the request for the qualification and compatibility information upon receiving the request from the user device 105. Accordingly, the formation device 140 may only select those agents who are known to be available. Therefore, steps 420 and 440 may be omitted in such a scenario.

In a second example, the formation device 140 may not separate the steps of selecting the different members of the team. That is, the formation device 140 may not select the members individually nor be incapable of altering previously selected members. Those skilled in the art will understand that the formation device 140 may perform the above functionalities to consider each decision as a whole to thereby consider each type of permutation for the members included in the team. Accordingly, when an agent has the capability of fulfilling different roles and/or skills, the formation device 140 may determine different permutations of members for the team and evaluate an overall skills parameter and compatibility parameter to determine the ultimate team to handle the request.

In a third example, the formation device 140 may determine that there may be required or recommended roles for the team. The required roles may be roles that must be included whereas the recommended roles may be roles that may further optimize the process of handling the request if present. These considerations may also be included when forming the team by the formation device 140.

The exemplary embodiments provide a system and method of compatibility based team formation. The exemplary embodiments relate to handling a request from a user device in a substantially real-time manner such as with a contact center. The exemplary embodiments may incorporate a skills approach in which the request requires more than one agent of the contact center to be used in handling the request. More specifically, the agents may work collaboratively as a team in handling the request. The exemplary embodiments may further incorporate a compatibility approach in which the request has a plurality of roles in completing the request by the team. The agents may have provided compatibility information that indicates roles that they assume such that the exemplary embodiments may further consider this information in forming the team that handles the request.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method for forming a team of agents from a plurality of agents to handle a user request, the method comprising:
   receiving, by a formation device of a contact center, a user request from a user device, the user request associated with a type of user request;
   in response to receiving the request, determining, by the formation device, a plurality of member types required in handling the request based upon the type of request;
   after determining the plurality of member types, determining, by the formation device, two or more agents from the plurality of agents of the contact center to comprise the team of agents, wherein the two or more agents are selected such that each of the two or more agents has at least one of the plurality of member types and such that the two or more agents collectively have the plurality of member types, and wherein each of the two or more agents are associated with respective member devices from a plurality of member devices;
   after determining the two or more agents, transmitting, by the formation device, a request to the respective member devices of the contact center respectively associated with each of the agents to participate in a real-time communication with the user device in handling the user request as a team; and
   connecting the respective member devices to the real-time communication with the user device in response to the request.

2. The method of claim 1, further comprising:
   determining, by the formation device, a plurality of skill types required in handling the request based upon the type of request; and determining, by the formation device, whether the plurality of agents collectively have the plurality of skill types.

3. The method of claim 2, further comprising:
determining an updated plurality of agents of the contact center when the plurality of agents lack at least one of the skill types, the updated plurality of agents collectively having the plurality of member types and the plurality of skill types.

4. The method of claim 1, further comprising:
receiving, by the formation device, compatibility data from each of the plurality of member devices being respectively used by the plurality of agents, the compatibility data indicating at least one of the plurality of member types of the respective agent.

5. The method of claim 2, further comprising:
receiving, by the formation device, skill data from each of the plurality of member devices being respectively used by the plurality of agents, the skill data indicating at least one of the plurality of skill types of the respective agent.

6. The method of claim 4, wherein the compatibility data is received one of upon the member device being activated, upon the user logging into a contact center network via the member device, upon a information request being transmitted from the formation device, and a combination thereof.

7. The method of claim 1, wherein determining the two or more agents comprises:
selecting a first agent from the plurality of agents of the contact center having one of the required member types and adding the first agent to the team;
selecting a second agent from the plurality of agents of the contact center having another one of the required member types;
determining whether the second agent is compatible with the first agent based at least in part on a personality of the first agent and a personality of the second agent;
if the second agent is compatible with the first agent, adding the second agent to the team; and
if the second agent is not compatible with the first agent, selecting a third agent from the plurality of agents of the contact center that has the other one of the required member types and is compatible with the first agent, and adding the third agent to the team.

8. The method of claim 1, wherein the real-time communication is one of a voice-only communication and a video communication.

9. The method of claim 1, wherein the member types are based upon Belbin data.

10. The method of claim 9, wherein the member types include at least one of a plant, a resource investigator, a chairman, a coordinator, a shaper, a monitor-evaluator, a team worker, a company worker, an implementer, a completer finisher, and a specialist.

11. A formation device of a contact center for forming a team of agents from a plurality of agents to handle a user request, the formation device comprising:
a transceiver configured to receive a user request from a user device, the user request associated with a type of user request; and
a processor configured to form the team of agents to handle the user request by:
in response to receiving the request, determining a plurality of member types required in handling the request based upon the type of request; and
after determining the plurality of member types, determining two or more agents from the plurality of agents of the contact center to comprise the team of agents, wherein the two or more agents are selected such that each of the two or more agents has at least one of the plurality of member types and such that the two or more agents collectively have the plurality of member types, and wherein each of the two or more agents are associated with respective member devices from a plurality of member devices,
wherein the transceiver is further configured to:
after the processor determines the two or more agents, transmit a request to the respective member devices of the contact center respectively associated with each of the agents to participate in a real-time communication with the user device in handling the user request as a team; and
connect the respective member devices to the real-time communication with the user device in response to the request.

12. The formation device of claim 11, wherein the processor is further configured to determine a plurality of skill types required in handling the request based upon the type of request and determine whether the plurality of agents collectively have the plurality of skill types.

13. The formation device of claim 12, wherein the processor is further configured to determine an updated plurality of agents of the contact center when the plurality of agents lack at least one of the skill types, the updated plurality of agents collectively having the plurality of member types and the plurality of skill types.

14. The formation device of claim 11, wherein the transceiver is further configured to receive compatibility data from each of the plurality of member devices being respectively used by the plurality of agents, the compatibility data indicating at least one of the plurality of member types of the respective agent.

15. The formation device of claim 12, wherein the transceiver is further configured to receive skill data from each of the plurality of member devices being respectively used by the plurality of agents, the skill data indicating at least one of the plurality of skill types of the respective agent.

16. The formation device of claim 14, wherein the compatibility data is received one of upon the member device being activated, upon the user logging into a contact center network via the member device, upon a information request being transmitted from the formation device, and a combination thereof.

17. The formation device of claim 11, wherein determining the two or more agents comprises:
selecting a first agent from the plurality of agents of the contact center having one of the required member types and adding the first agent to the team;
selecting a second agent from the plurality of agents of the contact center having another one of the required member types;
determining whether the second agent is compatible with the first agent based at least in part on a personality of the first agent and a personality of the second agent;
if the second agent is compatible with the first agent, adding the second agent to the team; and
if the second agent is not compatible with the first agent, selecting a third agent from the plurality of agents of the contact center that has the other one of the required member types and is compatible with the first agent, and adding the third agent to the team.

18. The formation device of claim 11, wherein the real-time communication is one of a voice-only communication and a video communication.

19. The formation device of claim 11, wherein the member types include at least one of a plant, a resource investigator, a chairman, a coordinator, a shaper, a monitor-evaluator, a team worker, a company worker, an implementer, a completer finisher, and a specialist.

20. A contact center system for forming a team of agents from a plurality of agents to handle a user request, the contact center system comprising:
- a plurality of member devices used respectively by a plurality of agents of the contact center; and
- a formation device configured to receive a user request that is associated with a type of user request and form the team to handle the request by:
  - in response to receiving the request, determining a plurality of member types required in handling the request based upon the type of request; and
  - after determining the plurality of member types, determining two or more agents from the plurality of agents of the contact center to comprise the team of agents, wherein the two or more agents are selected such that each of the two or more agents has at least one of the plurality of member types and such that the two or more agents collectively have the plurality of member types, and wherein each of the two or more agents are associated with respective member devices from a plurality of member devices;
- after determining the two or more agents, transmitting a request to select ones of the respective member devices of the contact center respectively to participate in a real-time communication with the user device in handling the user request as a team; and
- connecting the respective member devices to the real-time communication with the user device in response to the request.

* * * * *